United States Patent [19]
Sato

[11] Patent Number: 5,894,390
[45] Date of Patent: *Apr. 13, 1999

[54] TAPE CASSETTE

[75] Inventor: Shinya Sato, Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/815,493

[22] Filed: Mar. 11, 1997

Related U.S. Application Data

[62] Division of application No. 08/525,212, Sep. 8, 1995, abandoned.

[30] Foreign Application Priority Data

Sep. 21, 1994 [JP] Japan .................. 6-227039

[51] Int. Cl.$^6$ .................. G11B 23/04; G11B 23/087
[52] U.S. Cl. .................. 360/132
[58] Field of Search .................. 360/132, 133; 369/291

[56] References Cited

U.S. PATENT DOCUMENTS

| | | | |
|---|---|---|---|
| 4,671,469 | 6/1987 | Ikebe et al. .................. | 360/132 X |
| 5,276,675 | 1/1994 | Wanger et al. .................. | 369/291 |
| 5,317,467 | 5/1994 | Kato et al. .................. | 360/133 |
| 5,363,166 | 11/1994 | Takahashi et al. .................. | 354/275 |
| 5,388,779 | 2/1995 | Nishioka et al. .................. | 242/346 |
| 5,432,662 | 7/1995 | Kato et al. .................. | 360/133 |
| 5,477,299 | 12/1995 | Takahashi .................. | 354/275 |
| 5,479,311 | 12/1995 | Doushita et al. .................. | 360/132 |

FOREIGN PATENT DOCUMENTS

| | | |
|---|---|---|
| 1-30088 | 1/1989 | Japan . |
| 3-134050 | 6/1991 | Japan . |
| 4-21983 | 1/1992 | Japan . |
| 4-222979 | 8/1992 | Japan . |
| 6-195821 | 7/1994 | Japan . |

*Primary Examiner*—William J. Klimowicz
*Attorney, Agent, or Firm*—Jay H. Maioli

[57] ABSTRACT

A tape cassette has a pair of cassette shell members, a pair of reel hubs, and a hub brake member. The cassette shell members are coupled to each other with a tape-like recording medium housed therein. The cassette shell members have an opening defined therein with the tape-like recording medium exposed outwardly through the opening. The cassette shell members are made of a material composed of a synthetic resin and a silicon polymer mixed therewith. The hubs are rotatably disposed in the cassette shell members coupled to each other, and the tape-like recording medium are wound on the reel hubs. The hub brake member is disposed in slidable contact with an inner surface of one of the cassette shell members. The hub brake member is movable between a position in which the hub brake member engages the reel hubs to lock the reel hubs against rotation and a position in which the hub brake member disengages from the reel hubs to release the reel hubs for rotation.

1 Claim, 8 Drawing Sheets

■ Max. Track Value
□ Min. Track Value
■ Peak Value
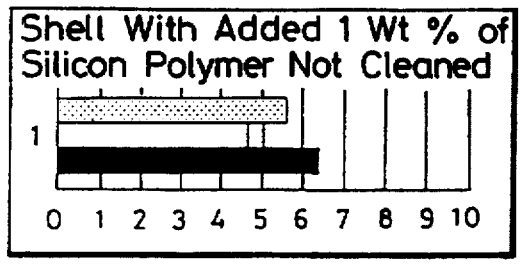
FIG. 5A1
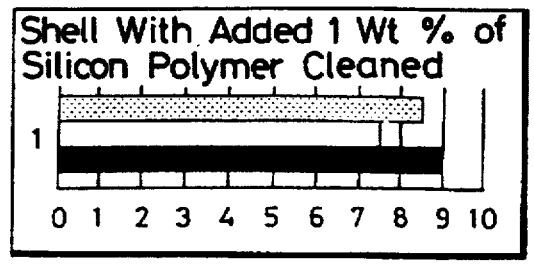
FIG. 5A2
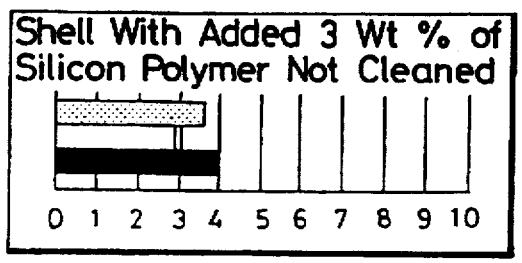
FIG. 5B1
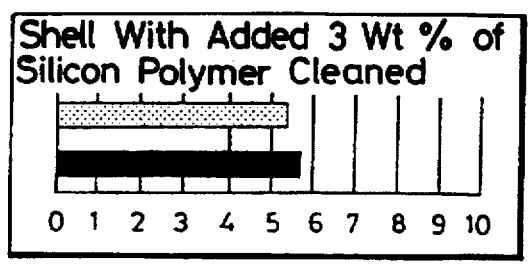
FIG. 5B2
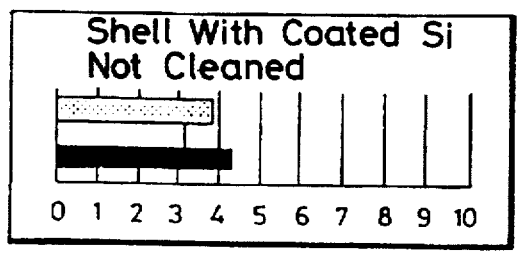
FIG. 5C1
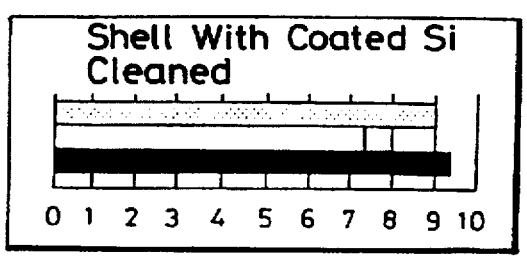
FIG. 5C2

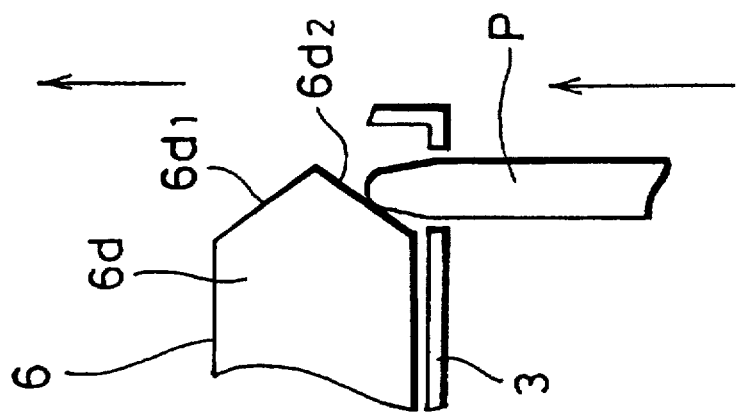

TAPE CASSETTE

This is a division of application Ser. No. 08/525,212 filed Sep. 8, 1995, now abandoned.

BACKGROUND OF THE INVENTION

1. Field of the Invention

The present invention relates to a tape cassette, and more particularly to a tape cassette comprising a pair of shells made of a synthetic resin material.

2. Description of the Related Art

One general type of tape cassette is an audio tape cassette comprising a magnetic tape wound around a pair of reel hubs and housed in a cassette shell, the magnetic tape having a portion guided by guide rollers and exposed in a front opening defined in the cassette shell. Some cassette tape players that have been available in recent years are of the high-density recording and reproducing type. A cassette tape player of the high-density recording and reproducing type is capable of recording information at high density and with high precision on the magnetic tape in a tape cassette that is loaded in the cassette tape player. If dust particles, fatty deposits, etc. are attached to the magnetic tape, then desired information cannot properly be recorded on and reproduced from the magnetic tape. To prevent such unwanted foreign matter from attaching to the magnetic tape, the tape cassette usually has a lid for covering the exposed portion of the magnetic tape thereby to protect the magnetic tape when not in use.

The tape cassette houses, in addition to tape guide members such as guide rollers for guiding the magnetic tape, a hub brake member for braking the reel hubs to prevent the magnetic tape from being unduly slackened, keep the reel hubs from wobbling, and protect the magnetic tape against damage.

When the tape cassette is loaded into the cassette tape player, the lid is opened, and the hub brake member is slid out of braking engagement with the reel hubs. Hub drive shafts are engaged with the respective reel hubs, and then driven to rotate the reel hubs for thereby transporting the magnetic tape. As the magnetic tape travels, the guide rollers are rotated.

While the magnetic tape is thus moving, desired information is recorded on or reproduced from the magnetic tape by a magnetic head that is held slidably against the magnetic tape.

Tape cassettes of the above structure, particularly miniature tape cassettes, comprising cassette shells and mechanical parts such as hub brake members housed therein, are required to be shaped precisely and be of small thickness. To meet these requirements, they are usually made of polycarbonate resins characterized by precision moldability.

If the cassette shells and mechanical parts are molded of the same synthetic resin, then they tend to adhere to or stick to each other due to the same surface hardness when they slide relatively to each other. As a result, the mechanical parts become highly sluggish, and fail to satisfy operational force ratings which they are required to meet for reliable operation.

In miniature tape cassettes, such an adhesion phenomenon occurs particularly between cassette shells and hub brake members that are held in sliding contact with inner surfaces of the cassette shells. One makeshift solution at present is to apply a lubricant liquid such as a dilute solution of silicon to the inner surfaces of the cassette shells which are contacted by the hub brake members.

However, applying a lubricant liquid such as a dilute solution of silicon to individual cassette shells results in an increase in the number of tape cassette assembling steps and in the cost of assembling tape cassettes. In addition, since it is highly likely for a lubricant liquid to be applied in different ways, e.g., in different concentrations, use of the lubricant liquid is responsible deterioration in quality.

SUMMARY OF THE INVENTION

It is therefore an object of the present invention to provide a tape cassette which resolves the above-mentioned problems.

According to the present invention, there is provided a tape cassette comprising a pair of cassette shell members and at least one reel hub. The cassette shell members are coupled to each other and a tape-like recording medium is housed therein. The cassette shell members have an opening defined therein with the tape-like recording medium exposed outwardly through said opening. The cassette shell members are made of a material composed of a synthetic resin and a silicon polymer mixed therewith. The reel hub is rotatably disposed in said cassette shell members coupled to each other, said tape-like recording medium being wound on said reel hub.

According to the present invention, there is also provided a tape cassette comprising a pair of cassette shell members, a pair of reel hubs, and a hub brake member. The cassette shell members are coupled to each other with and a tape-like recording medium is housed therein. The cassette shell members have an opening defined therein with the tape-like recording medium exposed outwardly through said opening. The cassette shell members are made of a material composed of a synthetic resin and a silicon polymer mixed therewith. The reel hubs are rotatably disposed in said cassette shell members coupled to each other, and said tape-like recording medium is wound on said reel hubs. The hub brake member is disposed in slidable contact with an inner surface of one of said cassette shell members. The hub brake member is movable between a position in which the hub brake member engages said reel hubs to lock the reel hubs against rotation and a position in which the hub brake member disengages from said reel hubs to release the reel hubs for rotation.

According to the present invention, there is further provided a tape cassette comprising a pair of cassette shell members and a movable inner member. The cassette shell members are coupled to each other and a tape-like recording medium is housed therein. The cassette shell members have an opening defined therein with the tape-like recording medium exposed outwardly through said opening. The movable member is disposed in said cassette shell members coupled to each other and movably held in contact with an inner surface of one of said cassette shell members. The movable member being made of a material composed of a synthetic resin and a silicon polymer mixed therewith.

Since the cassette shell members are made of a material composed of a synthetic resin and a silicon polymer mixed therewith, the frictional resistance which the cassette shell members impose on other mechanical parts housed in the cassette shell members is reduced.

Furthermore, because the movable member housed in the cassette shell members is made of a material composed of a synthetic resin and a silicon polymer mixed therewith, the frictional resistance which the movable member imposes on the cassette shell members is reduced.

Figure 7:
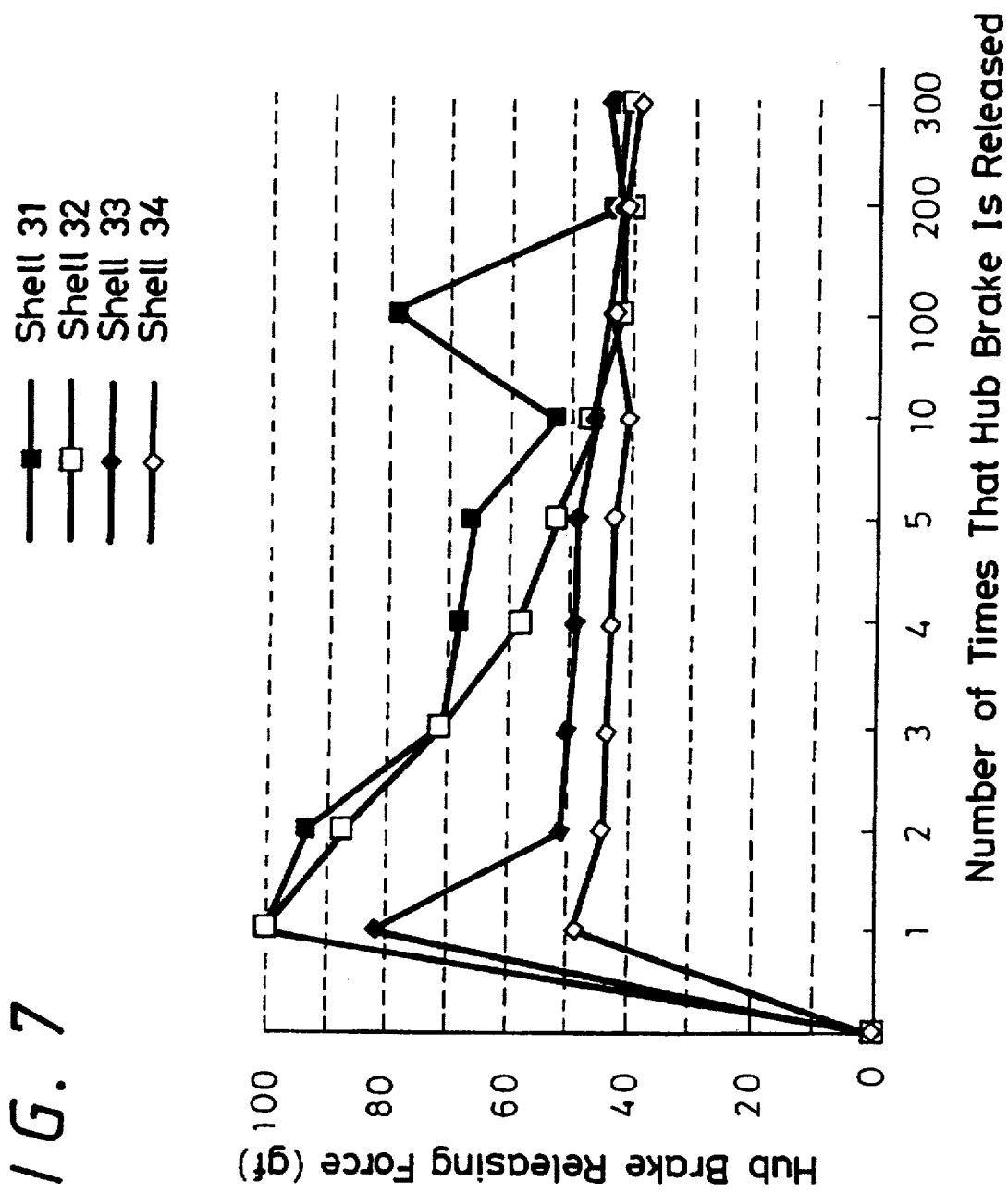
Figure 8:
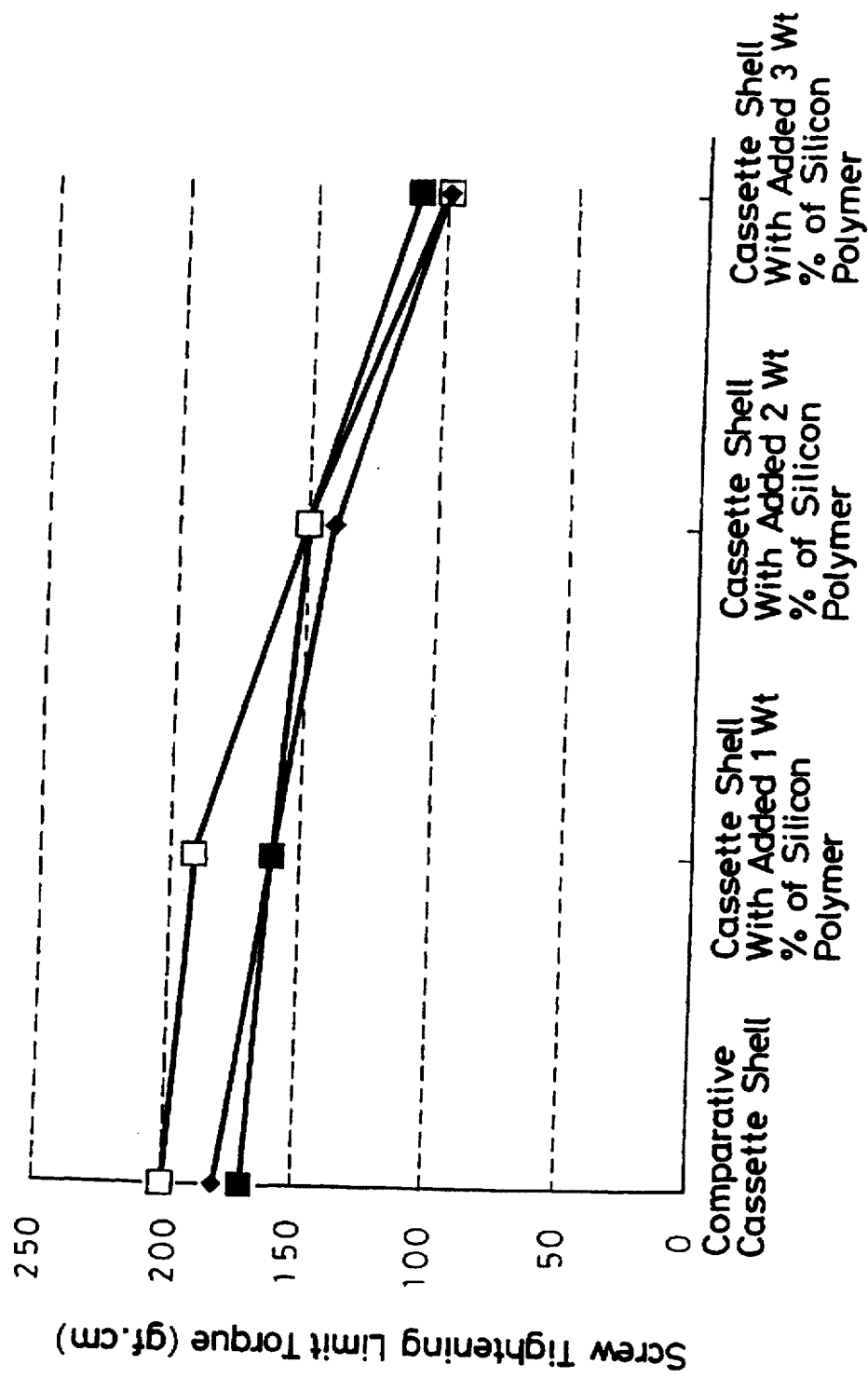

FIG. $5A_1$ is a diagram showing measured static frictional forces of a cassette shell A which was not cleaned;

FIG. $5A_2$ is a diagram showing measured static frictional forces of the cassette shell A which was cleaned;

FIG. $5B_1$ is a diagram showing measured static frictional forces of a cassette shell B which was not cleaned;

FIG. $5B_2$ is a diagram showing measured static frictional forces of the cassette shell B which was cleaned;

FIG. $5C_1$ is a diagram showing measured static frictional forces of a cassette shell C which was not cleaned;

FIG. $5C_2$ is a diagram showing measured static frictional forces of the cassette shell C which was cleaned;

FIGS. 6A and 6B are schematic diagrams illustrative of a process of measuring brake releasing forces of a hub brake member, FIG. 6A showing the manner in which the hub brake member is engaged by a hub brake release pin, FIG. 6B showing the manner in which braking by the hub brake member is released by the hub brake release pin;

FIG. 7 is a diagram showing measured brake releasing forces of a hub brake member with respect to different cassette shells; and FIG. 8 is a diagram showing measured screw tightening limit torques for a tapping screw with respect to different cassette shells.

DETAILED DESCRIPTION OF THE PREFERRED EMBODIMENT

A lightweight miniature tape cassette will be described below as a tape cassette according to the present invention.

Figure 1:
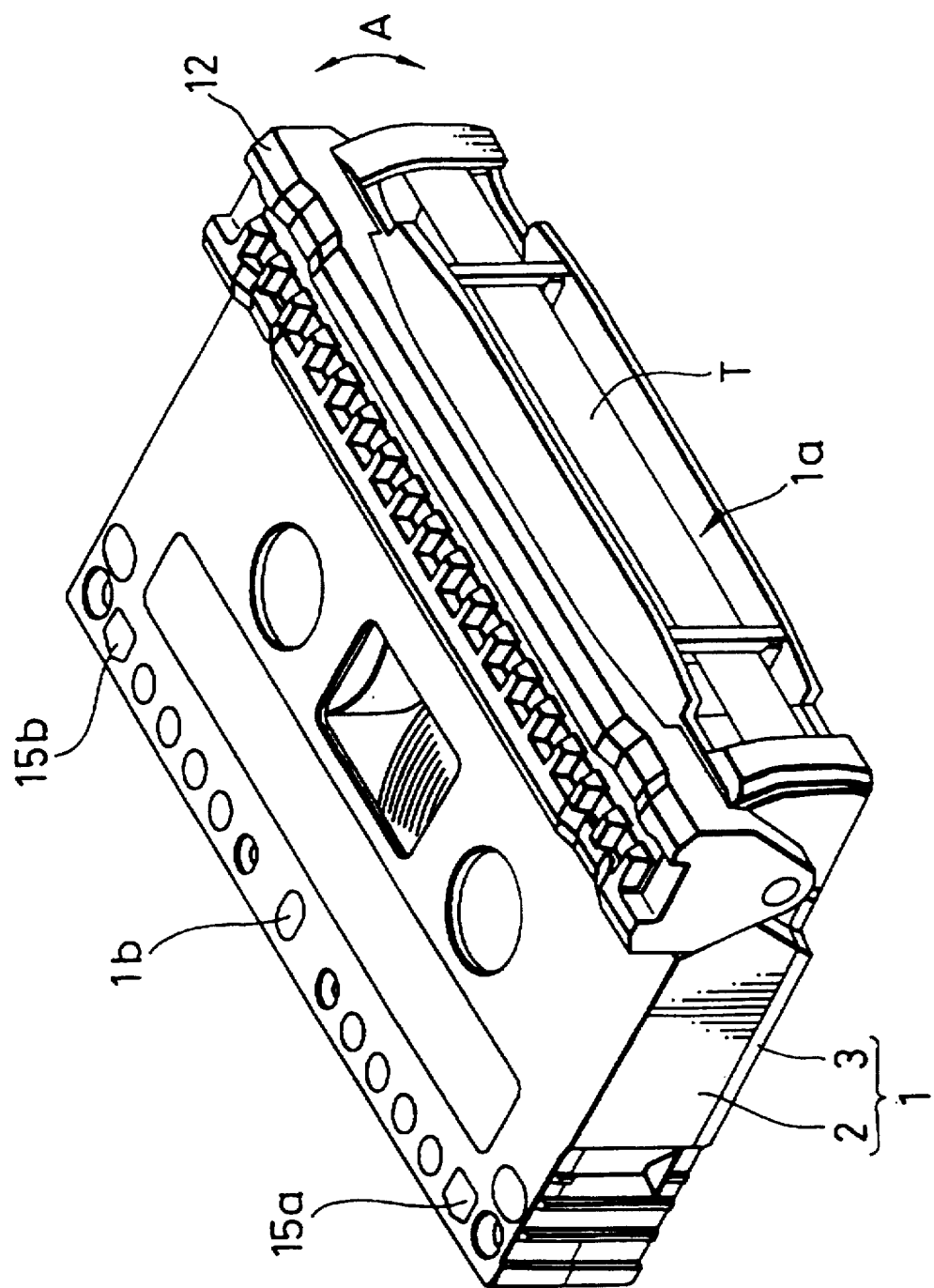
FIG. 1 is a perspective view of a tape cassette according to an embodiment of the present invention.
Figure 2:
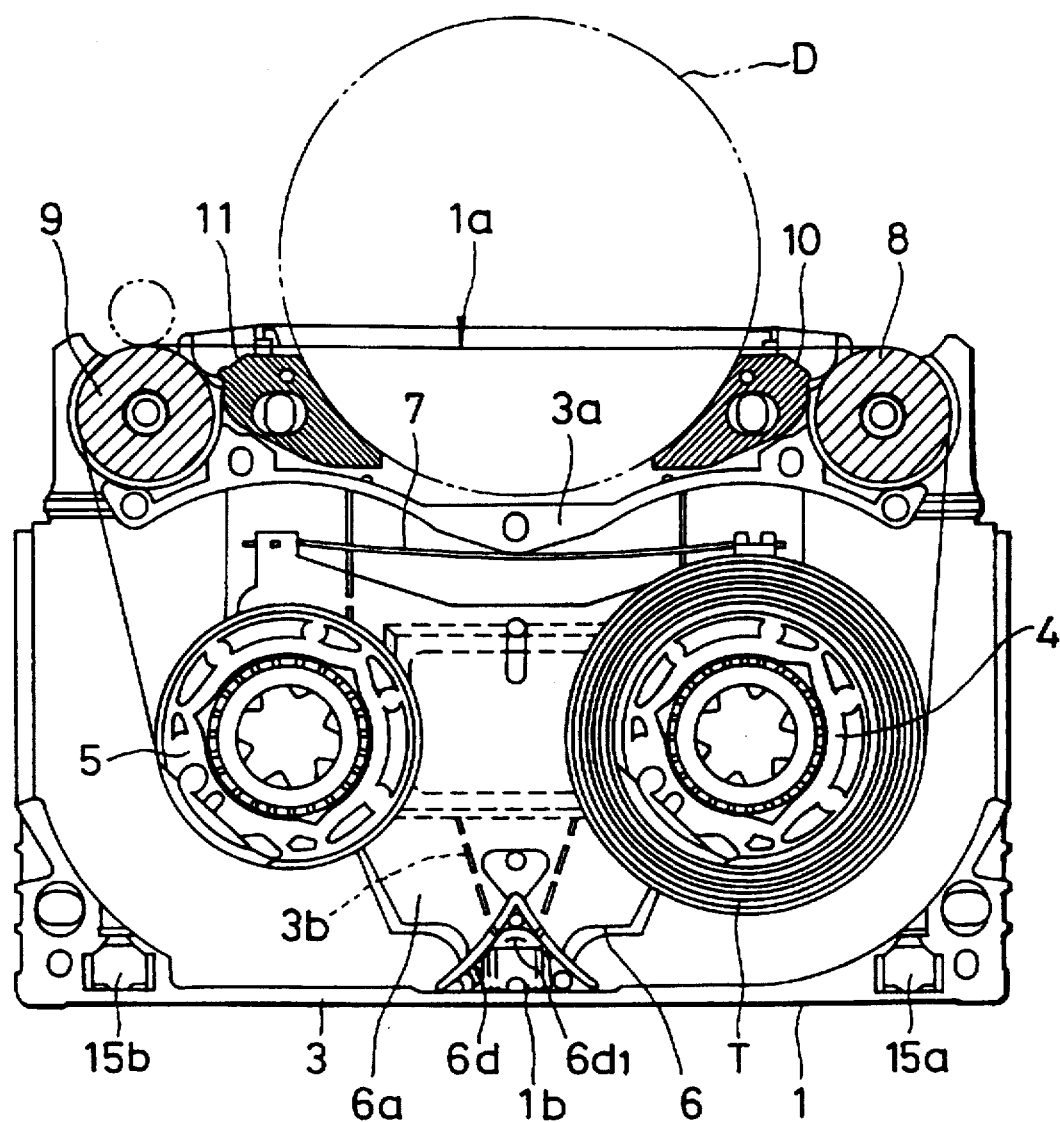
FIG. 2 is a plan view showing an internal structure of the tape cassette.
Figure 3:
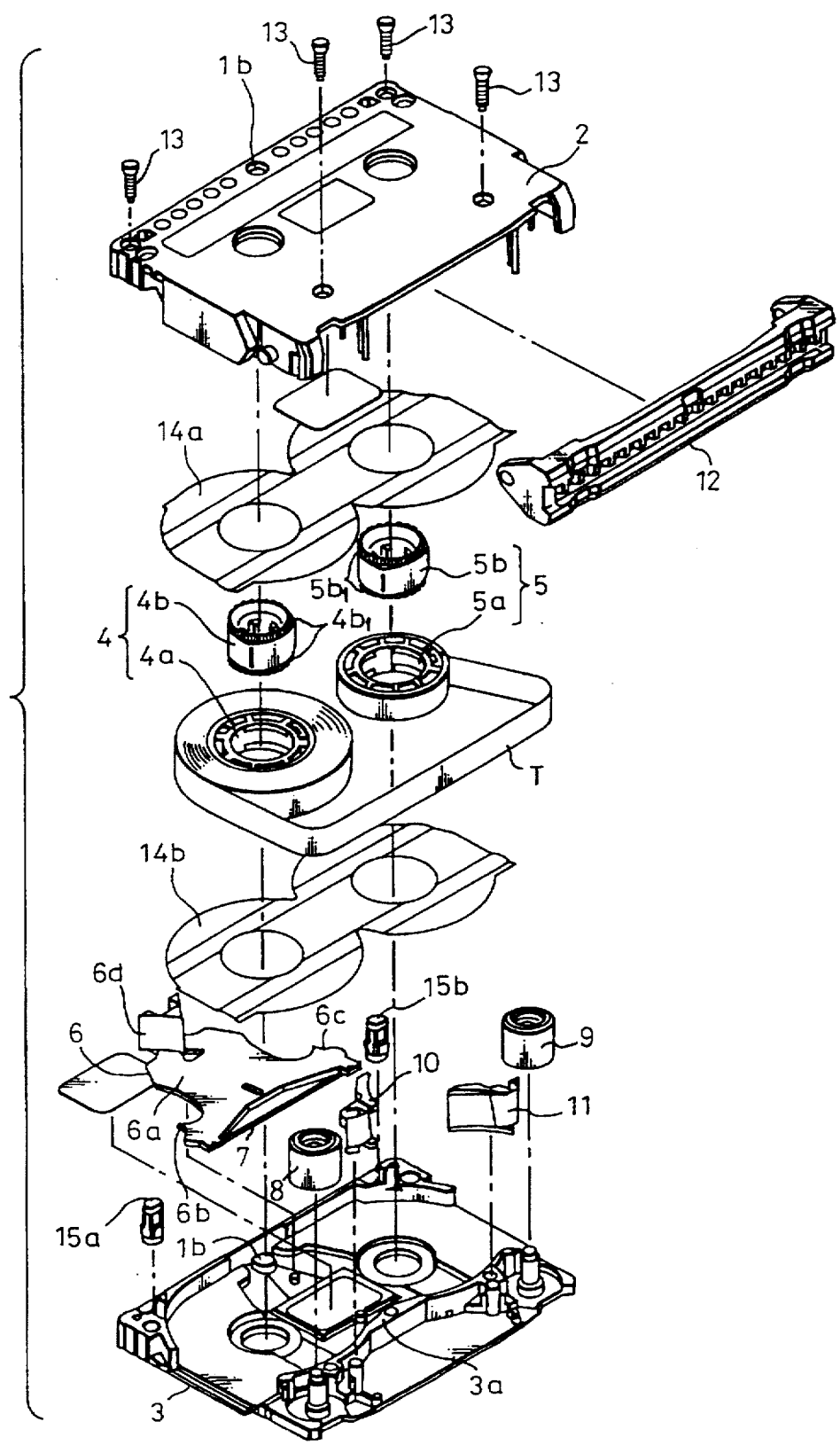
FIG. 3 is an exploded perspective view of the tape cassette.

The lightweight miniature tape cassette, which is of a structure shown in FIGS. 1 through 3, has a planar size as large as a postage stamp.

The miniature tape cassette has a cassette shell 1 comprising a pair of upper and lower cassette shell members 2, 3 coupled to each other, and a magnetic tape T wound as a tape-like recording medium on a pair of reel hubs 4, 5 housed in the cassette shell 1. As shown in FIGS. 2 and 3, the reel hubs 4, 5 comprise respective outer hub members 4a, 5a around which the magnetic tape T is wound and respective inner hub members 4b, 5b fit in and circumferentially engage the outer hub members 4a, 5a, respectively. The inner hub members 4b, 5b have such an axial dimension that their axially opposite ends project from the axially opposite ends of the outer hub members 4a, 5a, respectively, and the projecting ends of the inner hub members 4b, 5b have respective engaging gears $4_{b1}$, $5_{b1}$.

When the tape cassette is not in use, the reel hubs 4, 5 are locked by a hub brake member 6 (see FIG. 3) for protection against undesirable rotation and wobbling movement. The hub brake member 6 comprises a plate 6a held in slidable contact with an inner surface of the cassette shell 1, i.e., an inner surface of the lower shell member 3 in FIG. 3, a pair of locking teeth 6b, 6c disposed on respective opposite sides of a front edge of the plate 6a for locking engagement with the engaging gears $4_{b1}$, $5_{b1}$ of the reel hubs 4, 5, and a presser member 6d projecting rearwardly from a rear edge of the late 6a. The presser member 6d has a pair of upper and lower inclined surfaces $6d_1$, $6d_2$ (see also FIGS. 6A and 6B) which can be engaged by a hub brake release pin of a recording and reproducing apparatus. A spring 7 is supported under tension on the front edge of the plate 6a and is held in engagement with a front wall of the lower shell member 3 for normally biasing the hub brake member 6 in a direction to bring the locking teeth 6b, 6c into locking engagement with the engaging gears $4_{b1}$, $5_{b1}$ of the reel hubs 4, 5.

As shown in FIG. 2, a pair of pinch rollers 8, 9 doubling as guide rollers is rotatably disposed in the cassette shell 1, one on each side of a front opening 1a defined in a front panel of the cassette shell 1. A pair of tape guides 10, 11 is positioned adjacent to and inwardly of the respective pinch rollers 8, 9. The magnetic tape T wound around the reel hubs 4, 5 is guided by the pinch rollers 8, 9 and the tape guides 10, 11 to extend in the front opening 1a. The tape guides 10, 11 are supported on respective pins mounted on the inner surface of the lower shell member 3 for angular movement about the respective pins along the outer circumferential surface of a head drum D that is inserted into the front opening 1a. The tape guides 10, 11 have respective arcuate concave surfaces to face the outer circumferential surface of the head drum D.

The front opening 1a in which the magnetic tape T extends is normally closed by a lid 12 for protecting the magnetic tape T. The lid 12 is angularly movably mounted on the cassette shell 1 for swinging movement in the directions indicated by the arrow A in FIG. 1, i.e., in an upward direction toward the upper surface of the cassette shell 1 as shown in FIG. 1 and a downward direction toward the lower surface of the cassette shell 1.

The upper and lower shell members 2, 3 are coupled to each other by tapping screws 13 (see FIG. 3) that are threaded from above the upper shell member 2 into the lower shell member 3.

Transparent slippery sheets 14a, 14b are disposed between the reel hubs 4, 5 and the inner surfaces of the upper and lower shell members 2, 3, specifically between the magnetic tape T and the inner surfaces of the upper and lower shell members 2, 3. Plugs 15a, 15b for detecting and preventing erroneous erasure are mounted on the cassette shell 1 for movement in the transverse direction of the cassette shell 1.

When the tape cassette is loaded into a recording and reproducing apparatus by the user, the lid 12 is automatically turned to open the front opening 1a, and hub drive shafts of the recording and reproducing apparatus are inserted into the reel hubs 4, 5 respectively. At the same time, a hub brake release pin of the recording and reproducing apparatus is inserted into the tape cassette through a insertion hole 1b defined in the rear portion of the tape cassette, and abuts against one of the upper and lower inclined surfaces $6d_1$, $6d_2$ of the presser member 6d of the hub brake member 6. Upon loading of the tape cassette into the recording and reproducing apparatus, the hub brake release pin pushes the engaged one of the upper and lower inclined surfaces $6d_1$, $6d_2$, sliding the hub brake member 6 forward against the bias of the spring 7 until the locking teeth 6b, 6c are disengaged from the engaging gears $4_{b1}$, $5_{b1}$ of the reel hubs 4, 5, which are now unlocked for rotation.

Then, when the user pushes a recording or playback switch of the recording and reproducing apparatus, a portion of the head drum D is inserted through the front opening 1a into the cassette shell 1 as indicated by the two-dot-and-dash line in FIG. 2, holding the magnetic tape T between the outer circumferential surface thereof and the tape guides 10, 11. A capstan of the recording and reproducing apparatus is pressed against one of the pinch rollers 8, 9 through the magnetic tape T, thus pinching the magnetic tape T therebetween. The hub drive shafts and the capstan are rotated to transport the magnetic tape T at a constant speed, during which time information and data can be recorded on and reproduced from the magnetic tape T by a magnetic head on the head drum D.

In order to allow said hub brake member 6 to slide smoothly against the cassette shell 1, the cassette shell 1, i.e., the upper and lower shell members 2, 3, is molded of a polycarbonate resin as a base material thereby increasing the slidability of the upper and lower shell members 2, 3.

Specifically, a polycarbonate resin as a base material is mixed with a powdery silicon polymer, producing a composite resin material which is then pelletized. The upper and lower shell members 2, 3 are injection-molded from the pelletized composite resin material by an injection molding machine. It has been found out that the upper and lower shell members 2, 3 which are injection-molded from the pelletized composite resin material composed of polycarbonate resin and silicon polymer mixed therewith have improved slidability while keeping the properties of the polycarbonate resin.

The silicon polymer mixed with the polycarbonate resin to be used in molding the upper and lower shell members 2, 3 comprises a phenylmethyl silicon polymer (F series) or a dimethyl silicon polymer (E series) manufactured by Toray/Dow Corning Co. Ltd.

The dimethyl silicon polymer is sufficiently compatible with the polycarbonate resin. However, the phenylmethyl silicon polymer has better compatibility with the polycarbonate resin than does the dimethyl silicon polymer, and has excellent dispersibility.

When the upper and lower shell members 2, 3 are molded of a composite resin material composed of a polycarbonate resin and at least 1 weight % of a silicon polymer mixed therewith, the upper and lower shell members 2, 3 have improved slidability while keeping the properties of the polycarbonate resin, allowing mechanical parts in the tape cassette 1, especially the hub brake member 6, to slide smoothly against the tape cassette 1.

It is more effective to mix the silicon polymer in a range from 2.5 to 3.5 weight % with the polycarbonate resin. If the upper and lower shell members 2, 3 were molded of a composite resin material composed of a polycarbonate resin and at least 4 weight % of a silicon polymer mixed therewith, then the advantages are almost negated, causing the molded shell members to slip too easily when handled or failing to fasten the shell members with tapping screws due to stripping of threads, for example.

Data of some properties of the inventive cassette shells and comparative cassette shells will be described below.

First, static frictional forces of the inventive and comparative cassette shells were compared.

Figure 4:
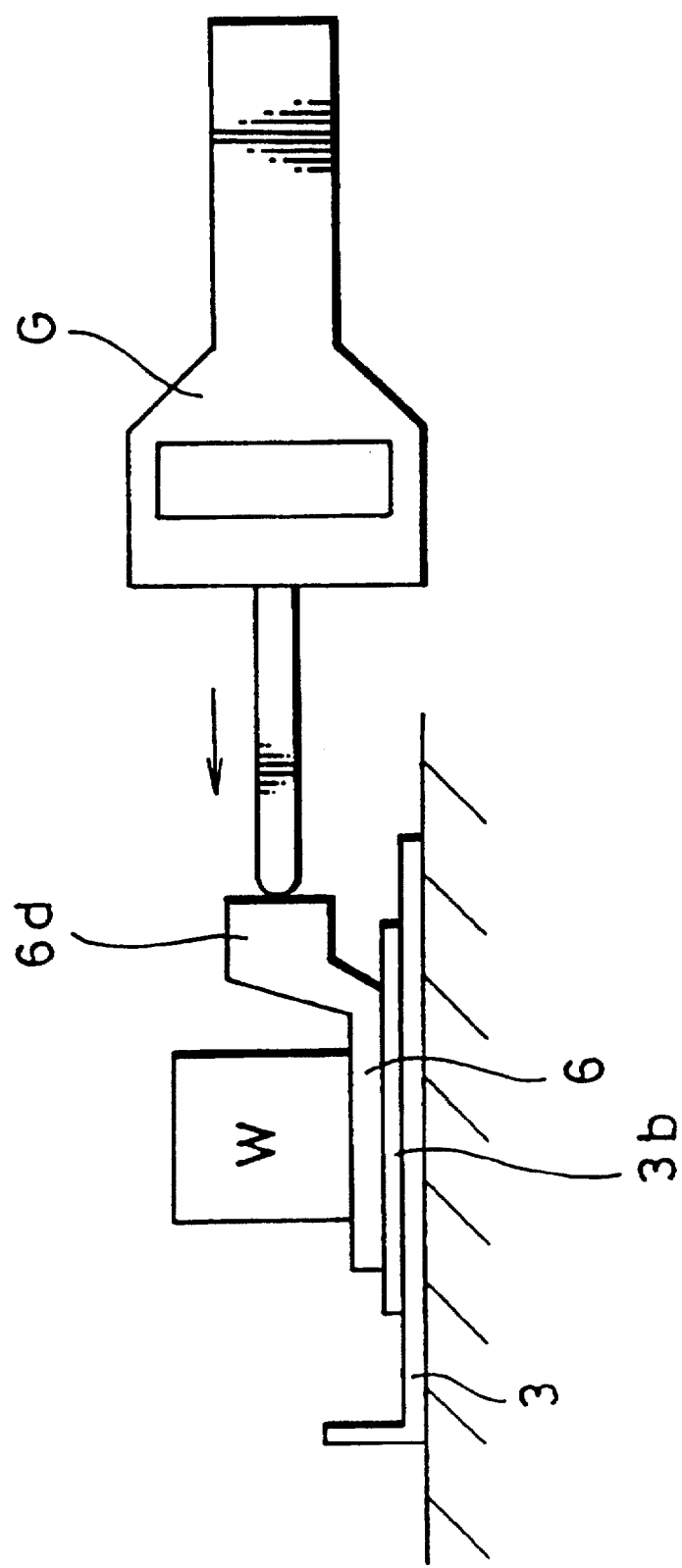
FIG. 4 is a schematic view illustrative of a process of measuring static frictional forces of a hub brake member.

Static frictional forces were measured as follows: As shown in FIG. 4, the hub brake member 6 cleaned with isopropyl alcohol (IPA) was placed on a rail 3b of the lower shell member 3, and a weight of 10 g was put on the hub brake member 6. Thereafter, when the presser member 6d of the hub brake member 6 was pressed by a digital force gage G, a peak value P and track values T were measured. The track values T included a maximum track value, Tmax and a minimum track value, Tmin.

Usually, resin-molded products carry a lubricating substance produced on their surface because constituents of the molding material are separated out. However, it is also possible for such a lubricating substance not to be produced on the surface of resin-molded products. In measuring static frictional forces, some of the inventive and comparative cassette shells were cleaned based on worst predicted conditions.

Inventive shell members A molded of a composite resin material composed of a polycarbonate resin and 2 weight % of a silicon polymer mixed therewith, inventive shell members B molded of a composite resin material composed of a polycarbonate resin and 3 weight % of a silicon polymer mixed therewith, and comparative shell members C molded of a polycarbonate resin and coated with a dilute solution of silicon were prepared. Some of the inventive shell members A, B and the comparative shell members C were cleaned with isopropyl alcohol (IPA), and the others were not cleaned. Then, static frictional forces of these inventive shell members A, B and the comparative shell members C were measured.

FIGS. $5A_1$ through $5C_2$ show the measured static frictional forces of the inventive shell members A, B and the comparative shell members C. FIGS. $5A_1$ and $5A_2$ illustrate the measured static frictional forces of the inventive shell members A. Specifically, FIG. $5A_1$ illustrates the measured static frictional forces of the inventive shell member A which was not cleaned, and FIG. $5A_2$ illustrates the measured static frictional forces of the inventive shell member A which was cleaned. FIGS. $5B_1$ and $5B_2$ illustrate the measured static frictional forces of the inventive shell members B. Specifically, FIG. $5B_1$ illustrates the measured static frictional forces of the inventive shell member B which was not cleaned, and FIG. $5B_2$ illustrates the measured static frictional forces of the inventive shell member B which was cleaned. FIGS. $5C_1$ and $5C_2$ illustrate the measured static frictional forces of the comparative shell members C. Specifically, FIG. $5C_1$ illustrates the measured static frictional forces of the comparative shell member C which was not cleaned, and FIG. $5C_2$ illustrates the measured static frictional forces of the comparative shell member C which was cleaned.

It can clearly be seen from FIGS. $5A_1$ through $5C_2$ that the static frictional forces of the comparative shell member C, which was molded from a polycarbonate resin and coated with a dilute solution of silicon, were very high when it was cleaned, as compared with that which was not cleaned. It can also be understood that the static frictional forces of the inventive shell members A, B, which were molded of a composite resin material composed of a polycarbonate resin and a silicon polymer mixed therewith, were relatively low even when they were cleaned, as compared with those which were not cleaned. Therefore, the inventive shell members A, B have relatively small frictional forces with respect to the hub brake member 6, allowing the hub brake member 6 to slide smoothly against the shell members.

Brake releasing forces of the hub brake member 6 with respect to shell members were compared.

Brake releasing forces were measured as follows: As shown in FIGS. 6A and 6B, the hub brake member 6 was placed on the lower shell member 3, and then while predetermined braking forces were being applied to the hub brake member 6, a hub brake release pin P was inserted through insertion hole 1b in the lower shell member 3 into abutting engagement with the inclined surface $6d_2$ of the presser member 6d, pushing the hub brake member 6 forward. Such a brake release action was repeated. The inclined surface $6d_2$ engaged by the hub brake release pin P was surface-treated with silicon to reduce frictional forces produced between itself and the hub brake release pin P.

A shell member $3_1$ molded of a composite resin material composed of a polycarbonate resin and 2 weight % of a dimethyl silicon polymer mixed therewith, a shell member $3_2$ molded of a composite resin material composed of a polycarbonate resin and 3 weight % of a dimethyl silicon polymer mixed therewith, a shell member $3_3$ molded of a composite resin material composed of a polycarbonate resin and 2 weight % of a phenylmethyl silicon polymer mixed therewith, and a shell member $3_4$ molded of a composite resin material composed of a polycarbonate resin and 3 weight % of a phenylmethyl silicon polymer mixed therewith were prepared. Then, brake releasing forces of the hub brake member 6 with respect to these shell member $3_1$, $3_2$, $3_3$, $3_4$ were measured.

FIG. 7 show the measured brake releasing forces of the hub brake member 6 with respect to these shell member $3_1$, $3_2$, $3_3$, $3_4$. A study of FIG. 7 indicates that the shell members $3_1$, $3_3$ which contained 2 weight % of a silicon polymer exhibited brake releasing forces that were high in the first cycle and unstable in succeeding cycles, and that the shell members $3_2$, $3_4$ which contained 3 weight % of a silicon polymer exhibited stable brake releasing forces in all the cycles except the first cycle. It can therefore be seen that a shell member molded of a composite resin material composed of a polycarbonate resin and 3 weight % of a silicon polymer mixed therewith allows the hub brake member 6 to be released stably and smoothly.

Screw tightening limit torques for tapping screws that are used to assemble shell members were compared.

A comparative cassette shell molded of only a polycarbonate resin, an inventive cassette shell $1_1$ molded of a composite resin material composed of a polycarbonate resin and 1 weight % of a silicon polymer mixed therewith, an inventive cassette shell $1_2$ molded of a composite resin material composed of a polycarbonate resin and 2 weight % of a silicon polymer mixed therewith, and an inventive cassette shell $1_3$ molded of a composite resin material composed of a polycarbonate resin and 3 weight % of a silicon polymer mixed therewith were prepared. Then, screw tightening limit torques for tapping screws that were used to assemble these comparative and inventive cassette shells were measured three times with a torque gage (600ATG).

FIG. 8 illustrates the measured screw tightening limit torques. A review of FIG. 8 shows that as the ratio of the silicon polymer to the polycarbonate resin increased, the frictional forces were lowered, the screw tightening limit torques were reduced due to a greater tendency for screw threads to be stripped.

The above analysis of the measured results is summarized as follows: In order to lower the frictional forces of the cassette shell, a silicon polymer is mixed with a polycarbonate resin as a base material, allowing mechanical parts, especially the hub brake member, to slide smoothly against the cassette shell. If the ratio of such a silicon polymer is 4 weight % or higher, then the frictional forces of the cassette shell become too low, causing the molded shell members to slip too easily when handled or to fail to fasten the shell members with tapping screws due to stripping of threads, for example, in the tape cassette assembling process.

As described above, the various advantages of the present invention can be attained when a polycarbonate resin as a base material of the cassette shell is mixed with at least 1 weight % of a silicon polymer. Specifically when a polycarbonate resin is mixed with 2.5–3.5 weight % of a silicon polymer, the advantages manifest themselves without any substantial problems.

No problems were recognized at any humidities and temperatures with respect to the printing strength, label application and protection properties, and the separating out of the silicon polymer on the surfaces of the cassette shell.

Whereas the cassette shell molded of a composite resin material composed of a polycarbonate resin and a silicon polymer mixed therewith has been described above, mechanical parts such as the hub brake member which are molded of such a composite resin material can exhibit the same measured data and offer the same advantages as described above. Screw tightening limit torques for tapping screws were not measured with respect to the hub brake member.

The principles of the present invention i.e., the miniature tape cassette, are also applicable to other tape cassettes and mechanical parts such as guide rollers, etc., disposed in tape cassettes. Since the guide rollers disposed in tape cassettes rotate while portions of the guide rollers are being held in contact with inner surfaces of the tape cassettes, the frictional resistance between the portions of the guide rollers and the inner surfaces of the tape cassettes can be lowered if the guide rollers are molded of a composite resin material composed of a polycarbonate resin and a silicon polymer mixed therewith.

The base material may comprise a thermoplastic resin such as an ABS resin, a polyamide resin, an acetal resin, or the like.

According to the present invention, as described above, inasmuch as a tape cassette is molded of a composite resin material composed of a polycarbonate resin and a silicon polymer mixed therewith, the tape cassette has reduced frictional forces, allowing mechanical parts in the tape cassette, especially a hub brake member, to slide smoothly against the tape cassette. Since a lubricant liquid such as a dilute solution of silicon is not required to be applied to the inner surfaces of the cassette shell, any process of applying such a lubricant liquid, which is composed of a number of steps, is dispensed with, and therefore the cost of the tape cassette is reduced.

The silicon polymer is mixed with the base material such as a polycarbonate resin or the like and hence is contained in the base material. As a result, the silicon polymer is free of the danger of peeling-off which would otherwise exist if it were applied as a layer to the surface of the molded shell member, and the tape cassette is sufficiently durable in use for a long period of time. The silicon polymer contained in the composite resin material makes it possible to improve the moldability of the composite resin material.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A tape cassette comprising:
   a pair of cassette shell members coupled to each other to form a cassette shell with a tape-like recording medium housed therein, said cassette shell having an opening defined therein with said tape-like recording medium exposed outwardly through said opening;
   a pair of cylindrical reel hubs having annular engaging gears at one end thereof and being disposed in said cassette shell; and a brake member including a plate and being disposed in said cassette shell, said brake member being movably held in said cassette shell so that sliding linear contact occurs between said plate and an inner surface of one of said pair of cassette shell members when said brake member moves toward and away from said opening, wherein said plate of said brake member includes:

a pair of locking teeth unitarily formed with said plate at opposite ends of a first edge of said plate located closest to said opening, said pair of locking teeth engaging with said annular engaging gears when said plate of said brake member moves away from said opening, biasing means formed on said first edge of said plate for spring biasing said plate away from said opening, releasing means integrally formed on a second edge of said plate located farthest from said opening adapted to be moved toward said opening for disengaging said pair of locking teeth from said annular engaging gears, and said brake member being made of a composite material comprised of a polycarbonate resin and 2.5 through 3.5% weight of a solid silicon polymer powder mixed therewith, and said silicon polymer consists of one of a dimethyl silicon polymer and a phenylmethyl silicon polymer.

* * * * *